(12) United States Patent
Cui et al.

(10) Patent No.: US 11,037,443 B1
(45) Date of Patent: Jun. 15, 2021

(54) FACILITATION OF COLLABORATIVE VEHICLE WARNINGS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Cedar Hill, TX (US); Nigel Bradley, Canton, GA (US); Ari Craine, Marietta, GA (US); Robert Koch, Peachtree Corners, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 16/913,309

(22) Filed: Jun. 26, 2020

(51) Int. Cl.
*G08G 1/0967* (2006.01)
*G06K 9/00* (2006.01)
(Continued)

(52) U.S. Cl.
CPC ... *G08G 1/096783* (2013.01); *G06K 9/00718* (2013.01); *G06K 9/00825* (2013.01);
(Continued)

(58) Field of Classification Search
CPC .. G08G 1/096783; G08G 1/0175; G08G 1/04; H04W 4/44; G06K 9/00718; G06K 9/00825; G06K 9/325
(Continued)

(56) References Cited

U.S. PATENT DOCUMENTS 6,384,740 B1 5/2002 Al-Ahmed
6,392,564 B1 5/2002 Mackey et al.
(Continued)

FOREIGN PATENT DOCUMENTS

CN 103108083 3/2015
CN 107798252 10/2019
(Continued)

OTHER PUBLICATIONS

Roston "Google's Nearby Sharing demonstrated on video before release" https://www.slashgear.com/googles-nearby-sharing-demonstrated-on-video-before-release-24607665/. 9 pages.
(Continued)

*Primary Examiner* — Kerri L McNally
(74) *Attorney, Agent, or Firm* — Amin, Turocy & Watson, LLP

(57) ABSTRACT

This disclosure describes a solution to facilitate collaborative vehicle warnings via an edge node. An edge network can provide resources to the vehicles such that the vehicles can operate in a harmonic and safe manner. For example, a non-compliance of a vehicle captured by a video camera of another vehicle can be sent to the edge node for analysis. If other data related to non-compliances of the vehicle are received by the edge node, the edge node can label the vehicle as an unsafe vehicle. In response to the labeling the vehicle as an unsafe vehicle, the edge node can share this information with the vehicles that sent the video feed info and/or other vehicles that are nearby.

20 Claims, 10 Drawing Sheets

(51) Int. Cl.
    *G06K 9/32* (2006.01)
    *G08G 1/04* (2006.01)
    *H04W 4/44* (2018.01)
    *G08G 1/017* (2006.01)

(52) U.S. Cl.
    CPC ........... *G06K 9/325* (2013.01); *G08G 1/0175* (2013.01); *G08G 1/04* (2013.01); *H04W 4/44* (2018.02)

(58) Field of Classification Search
    USPC ........................................................ 340/901
    See application file for complete search history.

(56) References Cited

U.S. PATENT DOCUMENTS

| | | | |
|---|---|---|---|
| 6,558,164 | B2 | 5/2003 | Raha |
| 6,716,106 | B2 | 4/2004 | Wang et al. |
| 7,336,297 | B2 | 2/2008 | Ishigami et al. |
| 7,451,041 | B2 | 11/2008 | Laumeyer et al. |
| 7,636,630 | B2 | 12/2009 | Fushiki et al. |
| 7,697,479 | B2 | 4/2010 | Metke et al. |
| 7,982,634 | B2 | 7/2011 | Arrighetti |
| 8,302,007 | B2 | 10/2012 | Barcay et al. |
| 8,375,106 | B2 | 2/2013 | Sparks |
| 8,417,663 | B2 | 4/2013 | Cho et al. |
| 8,482,609 | B1 | 7/2013 | Mishra et al. |
| 8,706,131 | B2 | 4/2014 | Winters |
| 8,830,299 | B2 | 9/2014 | Osipov et al. |
| 8,924,240 | B2* | 12/2014 | Depura .................. G06Q 40/08 705/4 |
| 9,092,908 | B2 | 7/2015 | Rapoport et al. |
| 9,113,786 | B2* | 8/2015 | Li .......................... A61B 3/113 |
| 9,123,014 | B1 | 9/2015 | Erdmann et al. |
| 9,195,843 | B2 | 11/2015 | MacAskill et al. |
| 9,212,926 | B2 | 12/2015 | Attard et al. |
| 9,216,509 | B2 | 12/2015 | Renkis |
| 9,247,120 | B2 | 1/2016 | Thomas et al. |
| 9,357,181 | B2 | 5/2016 | Fujimatsu et al. |
| 9,392,508 | B2 | 7/2016 | Senarath et al. |
| 9,407,880 | B2 | 8/2016 | Renkis |
| 9,467,923 | B2 | 10/2016 | Karaoguz |
| 9,509,900 | B2 | 11/2016 | Jo |
| 9,585,038 | B2 | 2/2017 | Al-Shalash et al. |
| 9,614,958 | B2 | 4/2017 | Radermacher et al. |
| 9,747,502 | B2 | 8/2017 | Renkis |
| 9,775,001 | B2 | 9/2017 | Dunkin et al. |
| 9,809,158 | B2 | 11/2017 | Geller |
| 9,905,131 | B2 | 2/2018 | Lai |
| 9,940,530 | B2* | 4/2018 | Lai ...................... G06F 16/2455 |
| 9,996,749 | B2 | 6/2018 | Bataller et al. |
| 10,057,604 | B2 | 8/2018 | Von Novak et al. |
| 10,070,035 | B2 | 9/2018 | Slavin et al. |
| 10,091,203 | B2 | 10/2018 | Galloway et al. |
| 10,225,705 | B2 | 3/2019 | Bokestad et al. |
| 10,296,794 | B2 | 5/2019 | Ratti |
| 10,305,910 | B2 | 5/2019 | Galloway et al. |
| 10,318,828 | B2* | 6/2019 | Hampiholi ............. G08G 1/166 |
| 10,321,283 | B2 | 6/2019 | Johnson et al. |
| 10,347,127 | B2 | 7/2019 | Droz et al. |
| 10,358,143 | B2* | 7/2019 | Jain ........................ G06F 16/285 |
| 10,366,511 | B2 | 7/2019 | Goldman et al. |
| 10,366,586 | B1 | 7/2019 | Leizerovich et al. |
| 10,389,982 | B1 | 8/2019 | Fu et al. |
| 10,402,634 | B2 | 9/2019 | Kozakaya |
| 10,477,188 | B2 | 11/2019 | Stiglic et al. |
| 10,513,274 | B1 | 12/2019 | Sung et al. |
| 10,516,858 | B2 | 12/2019 | Watanabe et al. |
| 10,582,163 | B2 | 3/2020 | Hodge et al. |
| 10,585,942 | B2 | 3/2020 | Ramer et al. |
| 10,586,118 | B2 | 3/2020 | Guo et al. |
| 10,643,467 | B2 | 5/2020 | Alon |
| 10,735,882 | B2 | 8/2020 | Han et al. |
| 2003/0053658 | A1 | 3/2003 | Pavlidis |
| 2004/0203883 | A1 | 10/2004 | Jollis |
| 2004/0218910 | A1 | 11/2004 | Chang et al. |
| 2006/0230030 | A1 | 10/2006 | Volpa et al. |
| 2008/0048886 | A1* | 2/2008 | Brown .................. G08G 1/0175 340/937 |
| 2010/0267403 | A1 | 10/2010 | Lungaro et al. |
| 2013/0086467 | A1 | 4/2013 | Weber et al. |
| 2013/0103496 | A1 | 4/2013 | Shekar et al. |
| 2014/0210644 | A1* | 7/2014 | Breed ...................... G01S 19/17 340/905 |
| 2014/0302774 | A1* | 10/2014 | Burke ...................... H04W 4/08 455/3.05 |
| 2015/0042802 | A1* | 2/2015 | Kim .................... G06K 9/00825 348/148 |
| 2016/0063332 | A1 | 3/2016 | Sisbot et al. |
| 2016/0173827 | A1 | 6/2016 | Darman et al. |
| 2016/0203641 | A1 | 7/2016 | Bostick et al. |
| 2016/0379074 | A1 | 12/2016 | Nielsen et al. |
| 2016/0380820 | A1 | 12/2016 | Horvitz et al. |
| 2017/0006431 | A1 | 1/2017 | Donovan et al. |
| 2017/0076599 | A1* | 3/2017 | Gupta ....................... B60C 9/00 |
| 2017/0105146 | A1 | 4/2017 | Zeng et al. |
| 2018/0129653 | A1 | 5/2018 | Wang et al. |
| 2018/0130354 | A1* | 5/2018 | Bender ................ G08G 1/0133 |
| 2018/0158197 | A1 | 6/2018 | Dasgupta et al. |
| 2018/0332213 | A1 | 11/2018 | Kucharski et al. |
| 2018/0354509 | A1 | 12/2018 | Mullins |
| 2019/0001987 | A1 | 1/2019 | Kim et al. |
| 2019/0014513 | A1 | 1/2019 | Yang et al. |
| 2019/0154872 | A1 | 5/2019 | Leduc |
| 2019/0172345 | A1 | 6/2019 | Lin et al. |
| 2019/0215671 | A1 | 7/2019 | Takii et al. |
| 2019/0333113 | A1 | 10/2019 | Carlson et al. |
| 2019/0370980 | A1 | 12/2019 | Hollander et al. |
| 2019/0377345 | A1 | 12/2019 | Bachrach et al. |
| 2019/0378054 | A1 | 12/2019 | Pinel et al. |
| 2020/0033845 | A1 | 1/2020 | Park |
| 2020/0074853 | A1 | 3/2020 | Miller et al. |
| 2020/0074866 | A1 | 3/2020 | Delaney et al. |
| 2020/0241575 | A1 | 7/2020 | Meisenholder et al. |
| 2020/0336708 | A1 | 10/2020 | Hadas |
| 2020/0374483 | A1 | 11/2020 | Kleinrock et al. |

FOREIGN PATENT DOCUMENTS

| | | |
|---|---|---|
| EP | 2937812 | 10/2015 |
| EP | 2913796 | 3/2019 |
| GB | 2498035 | 7/2013 |
| KR | 101642487 | 7/2016 |
| WO | 2018/116488 | 6/2018 |
| WO | 2019/053695 | 3/2019 |

OTHER PUBLICATIONS

"Proximity and cross device communication" https://developers.google.com/nearby, Last Accessed Jun. 5, 2020. 2 pages.

Whitwam "How Google Nearby works, and how you can take advantage of it" Greenbot, https://www.greenbot.com/article/3078180/how-google-nearby-works-and-how-you-can-take-advantage-of.html, Jun. 13, 2016, 7 pages.

McCracken "Lyve's Photo-Organizing App Adds Mix, A Real-Time, Location-Based Sharing Feature" https://www.fastcompany.com/3045024/lyves-photo-organizing-app-adds-mix-a-real-time-location-based-sharing-feature, Apr. 13, 2015, 7 pages.

Constine "Facebook Launches "Nearby Friends" With Opt-In Real-Time Location Sharing to Help You Meet Up" Techcrunch.com, https://techcrunch.com/2014/04/17/facebook-nearby-friends/?renderMode=ie11, Apr. 17, 2014, 29 pages.

"Sblind Proximity Sharing" https://techcrunch.com/2014/04/17/facebook-nearby-friends/?renderMode=ie11, Last Accessed Jun. 5, 2020, 3 pages.

Drang "And now it's all this" https://leancrew.com/all-this/2013/01/geofencing-in-flickr/, Jan. 6, 2013, 4 pages.

"Location Automation: A Deeper Look at Alarm.com's Geo-Services" https://www.alarm.com/blog/geo-services-location-automation, Feb. 10, 2015, 8 pages.

(56) References Cited

OTHER PUBLICATIONS

Idrop News Staff "What is AirDrop?" iDROPNEWS, Nov. 7, 2017. 17 pages.
"SocialRadar app tells you about the people around you" News Atlas, Mar. 17, 2014, 9 pages.
McGarry "What is Apple's ARKit? Everything You Need to Know" tom's guide, Jan. 24, 2018, 9 pages.
"15 Reasons to Use Drones for Security Surveillance" ALTi, https://www.altiuas.com/drone-surveillance/, Last Accessed Jun. 5, 2020, 3 pages.
"Remote monitoring by autonomous drone: a new way to secure sensitive sites" Azur Drones, https://www.azurdrones.com/remote-monitoring-by-drone/, Apr. 3, 2020, 4 pages.
"Drone Automation Solution for Security & Surveillance" flytbase, https://flytbase.com/drone-security-solution/, Last Accessed Jun. 5, 2020, 6 pages.
"Safe cities: Using smart tech for public security" BBC Future, https://www.bbc.com/future/bespoke/specials/connected-world/government.html, Last Accessed Jun. 5, 2020, 10 pages.
Tarapong, et al. "Swarm Eye: A Distributed Autonomous Surveillance System" IJACSA) International Journal of Advanced Computer Science and Applications, vol. 9, No. 12, 2018, 10 pages.
"Intelligent AI Video Analytics" https://www.intelli-vision.com/intelligent-video-analytics/, Last Accessed Aug. 24, 2020 3 pages.
"Icetana" Icetana, https://icetana.com/, Last Accessed Aug. 24, 2020, 4 pages.
Stanley "The Dawn of Robot Surveillance: AI, Video Analytics, and Privacy" American Civil Liberties Union, Jun. 2019, 50 pages.
Ma et al. "Pattern Discovery for Video Surveillance" ISVC 2005, LNCS 3804, pp. 347-354, 2005.
Priya et al. "Human walking motion detection and classification of actions from Video Sequences" International Journal of Conceptions on Computing and Information Technology, vol. 3, Issue. 1, Apr. 2015; ISSN: 2345-9808.
Paul et al. "Human detection in surveillance videos and its applications—a review" EURASIP Journal on Advances in Signal Processing 2013, 2013:176, 16 pages.
Verma et al. "A review of supervised and unsupervised machine learning techniques for suspicious behavior recognition in intelligent surveillance system" Int. j. inf. tecnol.. Sep. 20, 2019, 14 pages.
"Schlenoff et al. ""An Approach to Predicting the Location of Moving Objects During On-RoadNavigation"" 18th International Joint Conference on Artificial Intelligence, Aug. 2003, 10 pages.".
Vu et al. "Grid-based localization and local mapping with moving object detection and tracking" https://hal.archives-ouvertes.fr/hal-01023076, Jul. 11, 2014, 28 pages.
Chen, Xiaoji "Engineering Uber's Self-Driving Car Visualization Platform for the Web" Uber Engineering, https://eng.uber.com/atg-dataviz/, Aug. 28, 2017.
Stynes et al. "A Probabilistic Approach to User Mobility Prediction for Wireless Services" IEEE, 2016, 6 pages.
Guo et al. "A zone-based content pre-caching strategy in vehicular edge networks" Future Generation Computer Systems 106 (2020) 22-33.
Office Action dated Mar. 12, 2021 for U.S. Appl. No. 16/913,266, 43 pages.

* cited by examiner

FACILITATION OF COLLABORATIVE VEHICLE WARNINGS

TECHNICAL FIELD

This disclosure relates generally to facilitating vehicle interaction. For example, this disclosure relates to facilitating collaborative vehicle warnings.

BACKGROUND

For example, a video camera is a camera used for electronic motion picture acquisition the television industry, but now common in other applications as well. Video cameras are used primarily in two modes. The first mode is a live television mode, where the camera feeds real time images directly to a display for immediate observation as soon as received by the display. A few cameras still serve live television production, but currently, most live connections are used for security, military/tactical, and industrial operations where surreptitious or remote viewing may be implicated or required. In the second mode, the images are recorded to a storage device for archiving or further processing; for many years, videotape was the primary format used for this purpose, but was gradually supplanted by optical disc, hard disk, and then flash memory. Recorded video is still used in television production, but is also more often used for surveillance and monitoring tasks in which an unattended recording of a past situation may be requested or required for later viewing or analysis.

The above-described background relating to facilitating collaborative vehicle warnings is intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
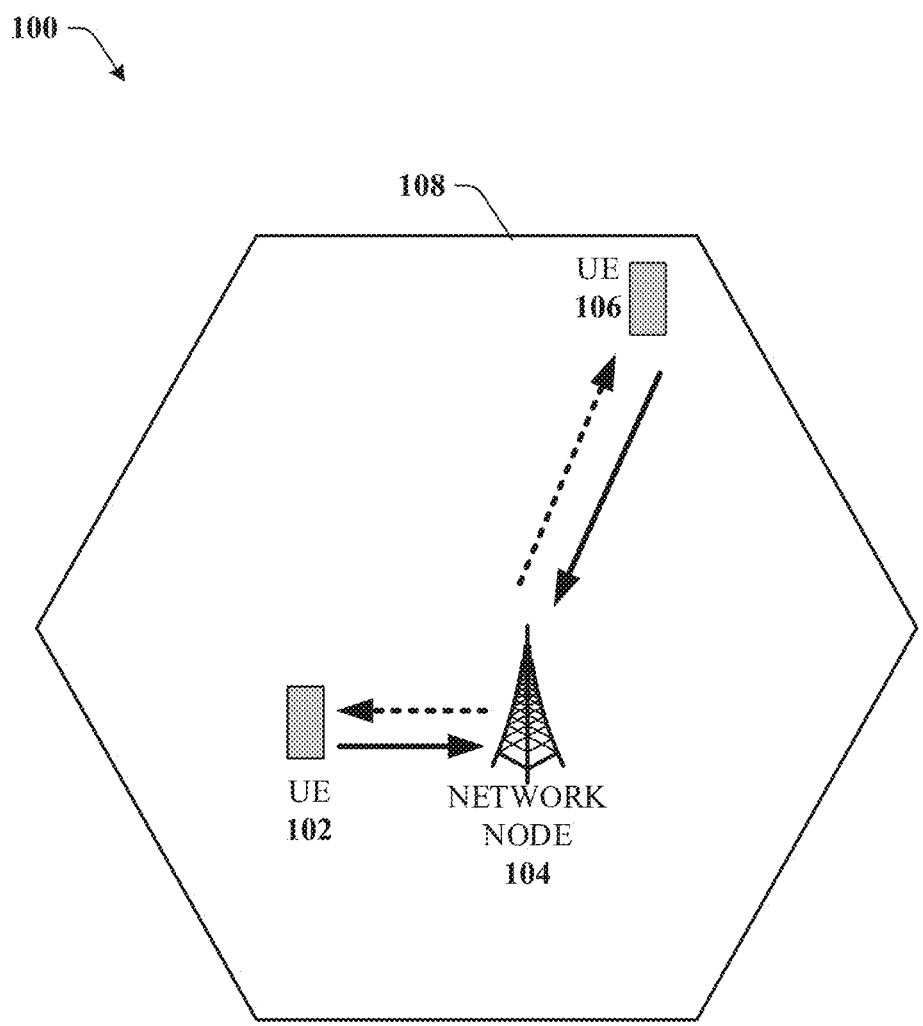
FIG. 1 illustrates an example wireless communication system in which network equipment (e.g., a network node device, or a network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate collaborative vehicle warnings. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate collaborative vehicle warnings. Facilitating collaborative vehicle warnings can be implemented in connection with any type of device with a connection to the communications network (e.g., a mobile handset, a computer, a handheld device, etc.), any Internet of things (IOT) device (e.g., toaster, coffee maker, blinds, music players, speakers, etc.), and/or any connected vehicles (cars, airplanes, space rockets, and/or other at least partially automated vehicles (e.g., drones), etc.). In some embodiments, the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, IOT device, laptop embedded equipped (LEE), laptop mounted equipment (LME), USB dongles, etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves a UE or network equipment connected to other network nodes or network elements or any radio node from where UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Edge computing is a distributed computing paradigm which brings computation and data storage closer to the location where it is needed, to improve response times and save bandwidth. Edge networks can host applications and application components at the edge servers, resulting in commercial edge computing services that host applications such as dealer locators, shopping carts, real-time data aggregators, and ad insertion engines. Modern edge computing significantly extends this approach through virtualization technology that makes it easier to deploy and run a wide range of applications on the edge servers.

Devices at the edge constantly consume data coming from the cloud, forcing companies to build content delivery networks to decentralize data and service provisioning, leveraging physical proximity to the end user. In a similar way, the aim of edge computing is to move the computation away from data centers towards the edge of the network, exploiting smart objects, mobile phones, or network gateways to perform tasks and provide services on behalf of the cloud. By moving services to the edge, it is possible to provide content caching, service delivery, storage and IoT management resulting in better response times and transfer rates.

A user can drive a vehicle A that can be networked via an access point 1 for the purpose of communicating with edge networks and/or a cloud network, such as via the Internet. For example, the access point can be any point, or device, or node (e.g., network node, access device, a network access device comprising a network node, a connection point to a telecommunications network, a transceiver, etc.) via which a vehicle can attach or connect to a wireless network. Edge nodes can be distributed and available along a path traversed by the vehicle. This disclosure describes an edge network-based solution, however, an alternative solution can employ a cloud-based architecture.

In various embodiments described herein, a driver of a non-autonomous vehicle A can be better informed about how nearby vehicles B, C and D are operating, and in relation to vehicle A. Vehicles B, C, and D can also be in communication with an access point. Further, an edge node can maintain communication with each vehicle while the vehicle is in range of the access point. Additionally, some (e.g., various types of information as later discussed) or all information being disseminated to the various vehicles can be based on their respective distances to/from the access point and/or each other. For instance, information sent from a passenger of a vehicle A may only be sent to Vehicle B if Vehicle A is within a defined first distance of the access point, vehicle B is within a defined second distance of the access point, and/or if Vehicle A and Vehicle B are within a defined third distance from each other. Such distances can be the same or different distances, and can be tailored for a given vehicle scenario that may be manifesting. Therefore, the edge node can be knowledgeable of which vehicles are in range, are autonomous, are non-autonomous, and/or their respective distances from each other.

As mentioned, the driver of vehicle A can be informed as to the operations of other nearby vehicles. For example, vehicle A can be can be equipped with an augmented reality (AR) view windshield. Alternatively, the driver of vehicle A can be equipped with augmented reality capabilities via eyeglasses or devices. The edge node can send its knowledge of which other vehicles are autonomous and non-autonomous to vehicle A. The edge node can also send current and/or predicted location information of each of the other vehicles so that vehicle A's AR system can correlate with the image that is viewed through the windshield to identify which vehicles correspond to which locations and present the AR displays accordingly. It should be noted that although discussed in reference to AR displays, embodiments within this disclosure can also be facilitated by any type of vehicle display screen that may be associated with a vehicle in which it is situated, e.g., a windshield augmented overlay, a display separate from or embedded in the vehicle, augmented reality goggles, glasses, or contact lenses, a user equipment or other user device determined to be within, or otherwise currently applicable to, the vehicle, etc.

Location and/or warning information can be either reported by the vehicles to the edge node or the edge node can determine if a vehicle is having safety issues based on a collaborative camera system utilizing cameras of other vehicles.

In this regard, various embodiments herein describe permitting vehicles and other mobile devices to collaboratively identify potential road hazards (e.g., bad drivers, defective vehicles, and/or other potentially unsafe situations and provide reports and alerts as a result).

A number of video cameras can be in operation in an area at a given point in time. They can be fixed (e.g., mounted), mobile (e.g., a dash camera in a moving vehicle), and/or stationary (e.g., parking lot, building, a dash camera in a parked vehicle, etc.). The cameras can provide a continuous video stream via an access point to an edge node. The edge node can analyze the video in real-time to identify irregularities in the environment that can pose a danger. One such irregularity can be the detection of a dangerous vehicle in the area. Since a potentially dangerous vehicle can only be within the frame of a given camera for a short period of time, a number of cameras can collaborate in order to identify the vehicle as dangerous.

As an example, vehicles A, B, and C can each send a continuous video feed to the edge node. The edge node can analyze all feeds for irregularities. For instance, the analysis can detect, e.g., that a vehicle D has changed lanes without signaling, that vehicle D is traveling out of its lane, that vehicle D's headlights are off during nighttime, that hazardous weather conditions exist, and/or that it is following too closely to other vehicles. In some circumstances, a number of vehicles can collaborate to identify video irregularities that, in aggregate, constitute a dangerous condition. Thresholds can be set such that a number of irregularities must occur and/or a type of irregularity must occur for a certain period of time to be determined to be a dangerous condition. For example, if video footage depicts that vehicle D has departed its lane four times, and the threshold for lane departures is three times, then the system can flag vehicle D as an unsafe vehicle. With this example threshold, past infractions are counted toward exceeding the threshold since no time is specified; however, the lane departures can also be analyzed with regard to time. For example, a rule could be set such that the vehicle must depart its lane four times within a one-minute time frame. Thus, with this example rule, previous lane departures that are not within the one-minute time frame can be deleted from consideration for qualifying the vehicle as unsafe. Therefore, the system can perform a recurring analysis taking into account infractions within the most recent time frame. The time frame can be previously set and/or determined based on other vehicle driver's preferences. For example, an alert can be directed to a driver of a vehicle when a nearby vehicle has departed its lane at least two times within a previous thirty seconds. Thus, user preferences can result in more or less stringent rules being enforced (e.g., relax or tighten thresholds, times, etc.) than overall system default settings, as facilitated by the edge node.

If a first vehicle's video feed analysis shows that another vehicle has changed lanes without signaling, then the edge node can tally the occurrence, and, if not detected again by any video feed, then no dangerous condition is registered. However, if the analysis of a second vehicle's video feed detects a lane change without a signal at a later timestamp, then the edge node can register a dangerous condition. It should also be noted that various non-compliances (past instances when a driver and/or associated vehicle have been non-compliant) can be used to generate an overall noncompliance score in relation to the presumptive danger. For instance, a lane departure coupled with inactive headlights can invoke a higher non-compliance score than a lane departure and following too closely to another vehicle. Similarly, a driver with a high incidence of accidents can invoke a higher non-compliance score when following too closely to another vehicle than a driver without any accidents.

Similarly, analysis of a vehicle video can show another vehicle is travelling out of its lane for a period of time. If the duration of the combined times is sufficient, then the edge node can register a dangerous condition. When the edge node registers a dangerous condition, the edge node can assign the dangerous condition to a specific vehicle. This vehicle model or profile can include identifying traits such as license plate number and/or distinctive markings. It can also include a make/model/color(s) of vehicle by comparing an image capture to a stored library of reference images. Optionally, the manufacturer's logo and model on the exterior of the vehicle can be used to help identify the vehicle if detected in the image. Other identifiable markings can include company logos, custom art work, phone numbers, web sites, damaged parts, e.g., bent fender, dragging muffler, broken windshield, etc., for instance, on delivery or other service vehicles.

It should also be noted that an artificial intelligence (AI) component can facilitate automating one or more features in accordance with the disclosed aspects. A memory and a processor as well as other components can include functionality with regard to the figures. The disclosed aspects in connection with facilitating collaborative vehicle warnings can employ various AI-based schemes for carrying out various aspects thereof. For example, a process for detecting one or more trigger events, facilitating a video capture as a result of the one or more trigger events, and/or modifying one or more reported measurements, and so forth, can be facilitated with an example automatic classifier system and process. In another example, a process for penalizing one video capture while preferring another video capture view can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing vehicle usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to modifying video captures, modifying one or more reported vehicle measurements, and so forth. The criteria can include, but is not limited to, predefined values, frequency attenuation tables or other parameters, service provider preferences and/or policies, and so on.

In one embodiment, described herein is a method comprising receiving, by an edge node comprising a processor, first image data representative of a first image of a first vehicle at a first time associated with the first image. Based on the first image data, the method can comprise determining that the first vehicle is exhibiting a noncompliance with an operation rule applicable to the first vehicle at the first time. The method can comprise receiving, by the edge node, second image data representative of a second image of the first vehicle at a second time after the first time. Based on the second image data, the method can comprise determining that the first vehicle is still exhibiting the noncompliance with the operation rule at the second time. The method can comprise determining, by the edge node, that a time difference between the second time and the first time is greater than a threshold time difference. Furthermore, in response to the determining that the time difference is greater than the threshold time difference, the method can comprise determining, by the edge node, that the first vehicle is operating in an unsafe capacity as a result of continued noncompliance with the operation rule from at least the first time to at least the second time. Additionally, in response to the determining that the first vehicle is operating in the unsafe capacity, the method can comprise sending, by the edge node, warning data representative of a warning to a second vehicle within a defined proximity of the first vehicle.

According to another embodiment, network equipment can facilitate receiving, from a first access point device, first image data representative of a first image of a first vehicle at a first time associated with the first image. Based on the first image data, the network equipment can comprise determining that the first vehicle has been noncompliant, at the first time, with an operation rule applicable to the first vehicle. The network equipment can comprise receiving, from a second access point device, second image data representative of a second image of the first vehicle at a second time after the first time, wherein the second image data was recorded by a second vehicle. Based on the second image data, the network equipment can comprise determining that the first vehicle has remained noncompliant, at the second time, with the operation rule applicable to the first vehicle. Additionally, in response to determining that a difference between the first image data and the second image data is greater than a threshold difference, the network equipment can comprise determining that the first vehicle is operating in a noncompliant mode. Furthermore, in response to determining that the first vehicle is operating in the noncompliant mode, the network equipment can comprise sending warning data representative of a warning to a second vehicle via at least one of the first access point device or the second access point device.

According to yet another embodiment, described herein is a machine-readable medium that can perform the operations comprising receiving, from a first video capture device, first image data representative of a first image a first vehicle that has been determined to be noncompliant with an operation rule. After the receiving the first image data, the machine-readable medium can perform the operations comprising receiving, from a second video capture device, second image data representative of a second image of the first vehicle that has been determined to have remained noncompliant with the operation rule. In response to receiving the second image data, the machine-readable medium can perform the operations comprising determining a number of times that the first vehicle has been noncompliant with the operation rule. In response to the number of times being determined to be greater than a noncompliance threshold number, the machine-readable medium can perform the operations comprising flagging the first vehicle as a noncompliant vehicle. Furthermore, in response to the flagging, the machine-readable medium can perform the operations comprising facilitating sending warning data, representative of a warning, to a second vehicle that has been determined to be a distance less than a threshold distance in proximity to the first vehicle, wherein the warning data comprises vehicle identification data representative of a characteristic of the first vehicle.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide wireless networking features and functionalities. For example, in addition to the various types of data communication between conventional UEs (e.g., phones, smartphones, tablets, PCs, televisions, Internet enabled televisions, etc.) supported by 4G networks, 5G and 6G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of wireless networks. With waveforms that split the bandwidth into several sub-bands, different types of services can be accommodated in different sub-bands with the most suitable waveform and numerology, leading to an improved spectrum utilization for wireless networks.

To meet the demand for data centric applications, features wireless networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, wireless networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain.

Figure 2:
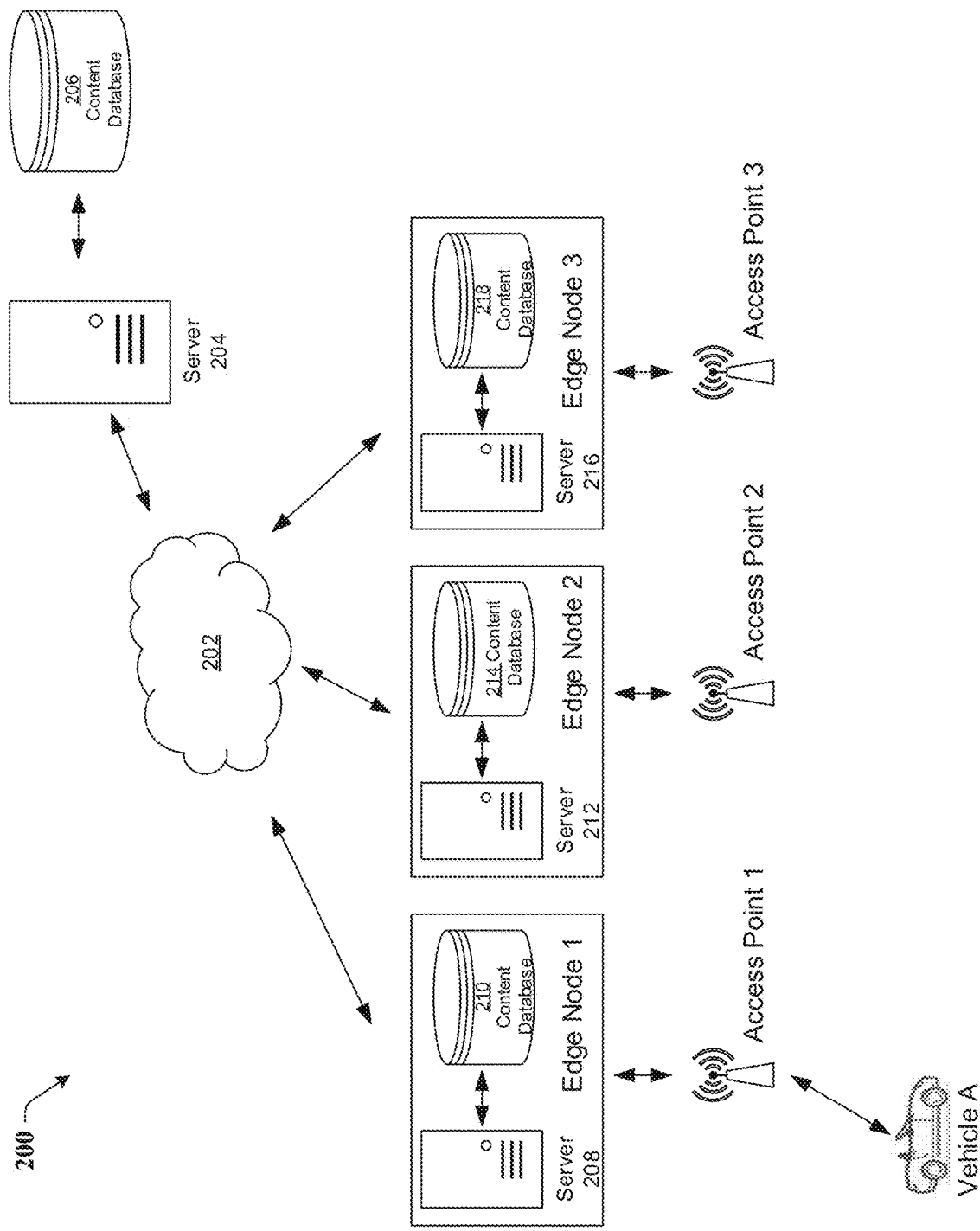
FIG. 2 illustrates an example schematic system block diagram of an edge network according to one or more embodiments.

Referring now to FIG. 2, illustrated is an example schematic system block diagram of an edge network 200 according to one or more embodiments. The edge network 200 can comprise a cloud-based architecture 202 by use of a cloud server 204 and a content database 206. The cloud-based architecture 202 can be in communication with one or more edge nodes (e.g., edge node 1, edge node 2, edge node 3, etc.). It should be noted that although FIG. 2 depicts three edge nodes, any number of edge nodes are possible to facilitate the spirit of this disclosure. The edge nodes can move vehicle services to the edge, where they can provide content caching, service delivery, storage, and/or IoT management resulting in better response times and transfer rates ideal for autonomous and non-autonomous vehicles. Each edge node 1, 2, 3 can comprise its own server and content database to store relevant content. For example, edge node 1 can comprise server 208 and content database 210, edge node 2 can comprise server 212 and content database 214, and edge node 3 can comprise serer 216 and content database 218. Access points 1, 2, 3 can be utilized to facilitate communication from vehicles to edge nodes 1, 2, 3, respectively. For example, vehicle A can communicate with the edge node 1 via the access point 1, such that wireless services are readily available for vehicle A. These wireless services can also be hosted at and/or communicated over the cloud-based architecture 202 to the server 204 and content database 206. The edge nodes 1, 2, 3 can be distributed in such a manner that when the vehicle A is out of range (or nearing a range threshold) of the access point 1, the access point 2 can begin communicating with the vehicle A such that there is no disruption in any of the services that were being provided to the vehicle A by the access point 2.

Figure 3:
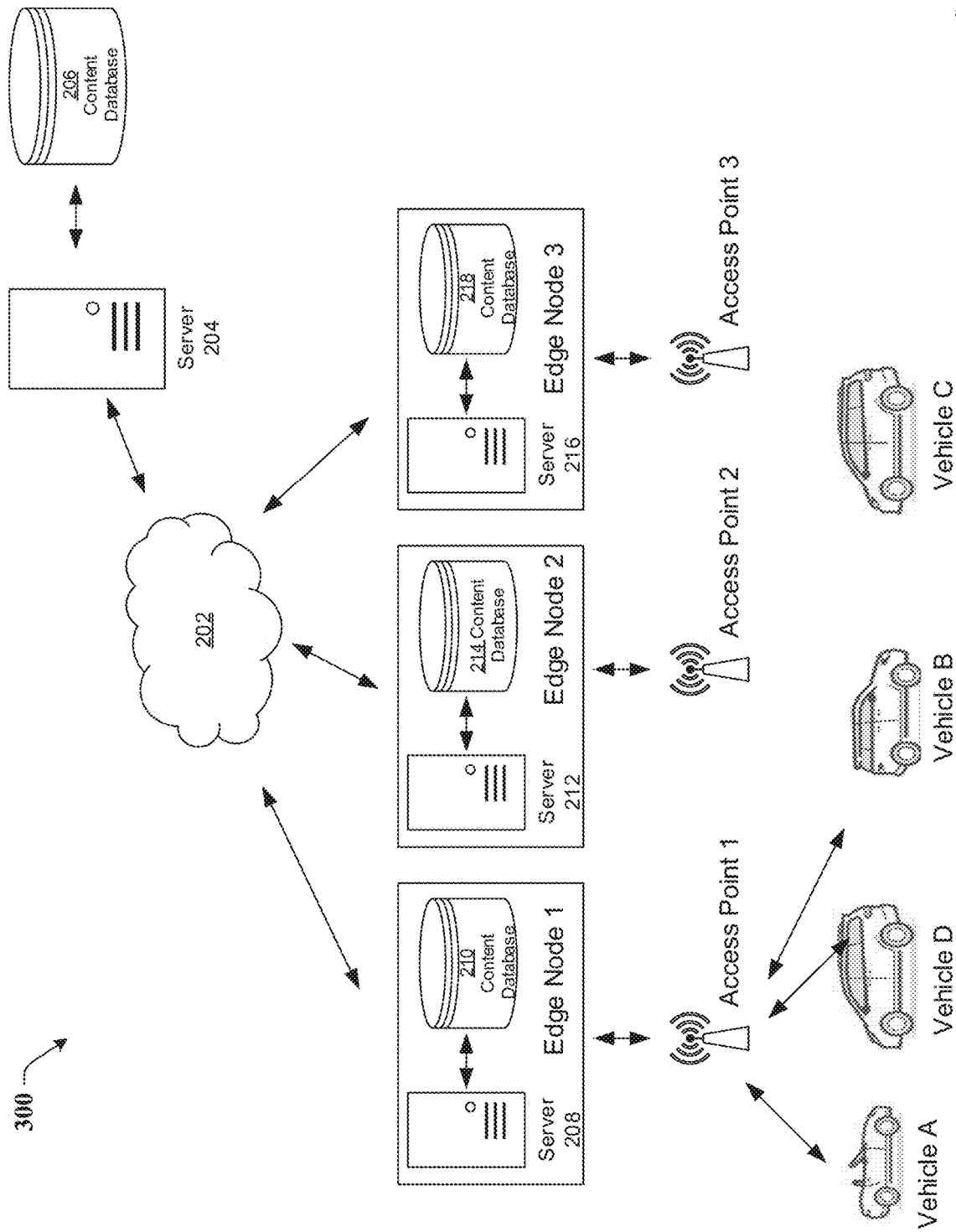
FIG. 3 illustrates an example schematic system block diagram of an edge network collaborative warning system according to one or more embodiments.

Referring now to FIG. 3, illustrated is an example schematic system block diagram of an edge network collaborative warning system 300 according to one or more embodiments.

Vehicle can comprise a video capture device, whereby if vehicle A's video feed analysis shows that another vehicle (e.g., vehicle D) has changed lanes without signaling, then this video feed data can be sent to edge node 1. The server 208 of edge node 1 can tally the occurrence(s) and if not detected again by any video feed (e.g., from vehicle B, vehicle C, etc.), then no dangerous condition is registered. However, if the analysis of vehicle B's video feed (that has been sent to the edge node 1) detects another lane change without a signal at a later timestamp, then edge node 1 can register a dangerous condition. It should also be noted that various non-compliances (e.g., failure to signal, driving too fast for conditions, no headlights, swerving, and/or other erratic or illegal usage) can be used to generate an overall noncompliance score in relation to the presumptive danger. For instance, a lane departure coupled with inactive headlights can invoke a higher non-compliance score than a lane departure and following too closely to another vehicle. Based on the non-compliance score, alerts can be sent to vehicles that are within a defined distance from the non-compliant vehicle and/or attached to the same edge node.

Additionally, edge node 1's analysis of vehicle A's video can show that vehicle D is travelling out of its lane for a period of time. However, vehicle A's camera may only be able to detect the lane departure for a short period of time (e.g., $t_1$-$t_2$) while it is in view. Edge node 1 can supplement the vehicle A video with vehicle B's feed, which can shows that vehicle D is also travelling out of its lane during another time ($t_2$-$t_3$). If the duration of the combined times (e.g., $t_1$-$t_3$) is sufficient (meets a defined threshold), then edge node 1 can register a dangerous condition. It should also be noted that the edge node 1 can request the additional from vehicle B and/or the additional video from vehicle B can automatically be sent to the edge node 1 upon capture.

When edge node 1 registers a dangerous condition, it can assign the dangerous condition to a specific vehicle (e.g., vehicle D). In the examples where vehicle D is the vehicle in non-compliance, the edge node 1 can create a model describing the vehicle. This model can include identifying traits such as license plate number and/or distinctive markings (e.g., dents, accident damage, bumper stickers, etc.). It can also include a make, model, model, and/or color of vehicle by comparing an image capture to a stored library (e.g., at contend database 210 and/or content database 206) of reference images. The image capture can also be shared with other edge nodes to assist in identification of the vehicle by comparing the image to other stored images of the other edge node databases. Optionally, the manufacturer's logo, model, and color(s) on the exterior of the vehicle can be used to help identify the vehicle if detected in the image. Other identifiable markings can include company logos, damaged parts, for instance, on delivery or other service vehicles. Further, some vehicles exhibit a signature sound, e.g., due to dis-repair or custom features, which can become part of a vehicle profile, where sound is available as input as well as video.

Figure 4:
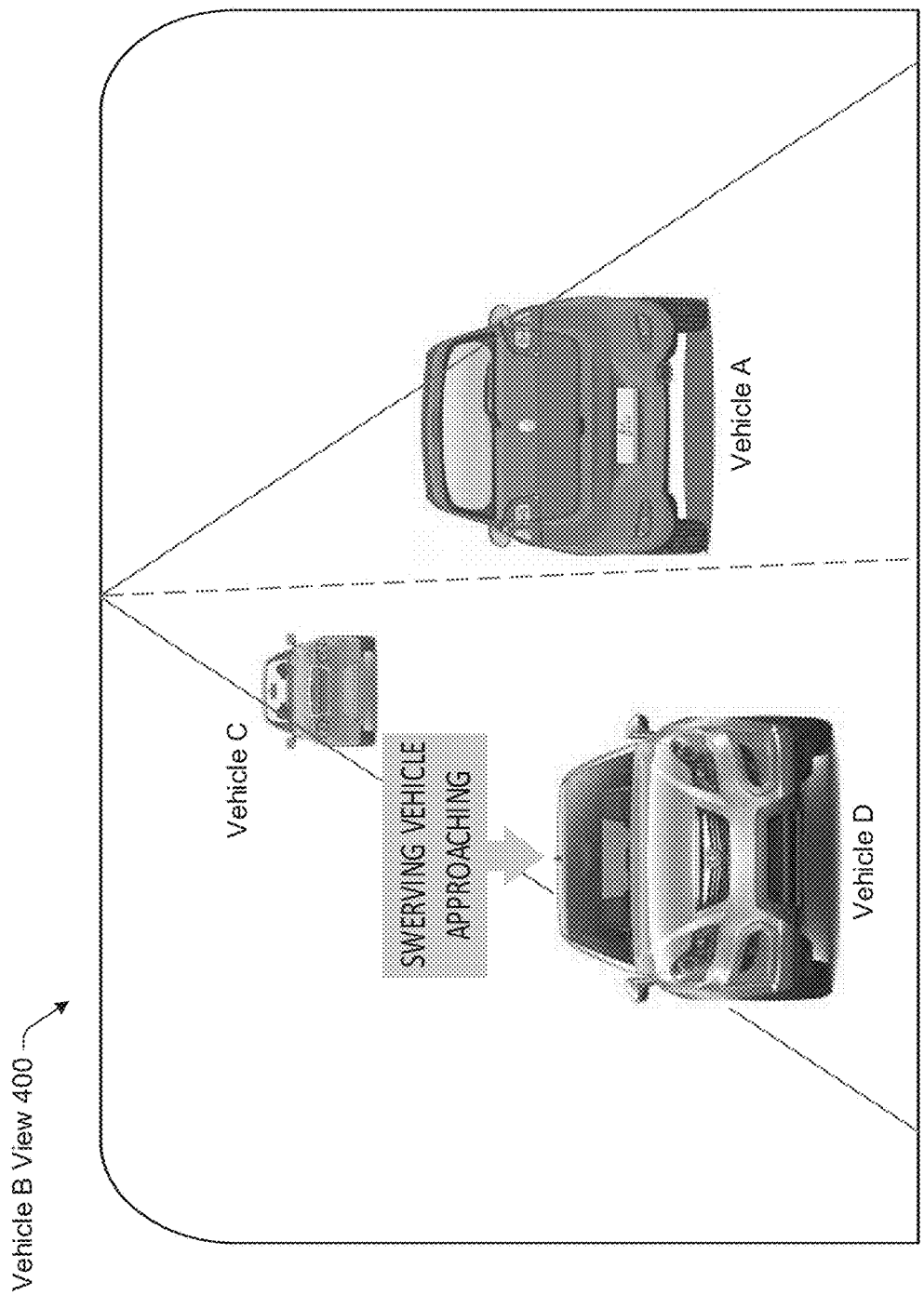
FIG. 4 illustrates an example schematic system block diagram of an augmented reality view of a vehicle warning according to one or more embodiments.

Referring now to FIG. 4, illustrated is an example schematic system block diagram of an augmented reality view 400 of a vehicle warning according to one or more embodiments.

Additionally, surrounding drivers can be alerted of the potentially dangerous vehicle D. One means for doing so can be to present an overlay on a rear-view electronic display, an augmented reality display, and/or any display within the vehicle that is perceivable by the driver of the vehicle. For instance, the image of the display can be analyzed to identify the vehicle matching the data model of the dangerous vehicle D. When a match is found, an alert can be presented to the driver of another vehicle (e.g., vehicle B). Optionally, an audible alert can be presented such as, "Caution: swerving vehicle approaching from behind". The overall solution presented can also be used for other types of vehicles such as autonomous vehicles and drones.

The vehicles can also communicate other publicly viewable information to the edge nodes and thereby make it available to other vehicles. This information can be matched against a database such as an abduction alert system (e.g., AMBER alert) listing to identify vehicles being sought. Alternatively, if a vehicle is being sought in a specific area, the identifying information for the vehicle can be pushed to the edge node (e.g., edge node 2, edge node 3) and then sent to the respective access points to be sent to vehicles within that area for faster processing. Consequently, an alert system, such as the augmented reality view 400, overlay can be displayed as a result.

Passengers in non-compliant vehicles (e.g., vehicle D) can also send display data that they wish to have presented to other vehicles. For instance, if someone has been kidnapped and/or feels unsafe. This data can be sent from the UE 102, that is within the vehicle D, to the edge nodes. This data can include text, image, audio, video, other media, and/or a request that a nearby camera (e.g., vehicle camera, stationary camera, drone camera, etc.) begin recording the vehicle D. The passenger's UE 102 can be associated with the vehicle they are riding in based on GPS, near-field communication (e.g., the UE 102 is communicating with vehicle D via Bluetooth, Wi-Fi, or some other wireless communication).

Likewise, if the edge node detects (based on video feeds from other vehicles) that vehicle D is on a path for a collision, the edge node can calculate the best paths for nearby autonomous and non-autonomous vehicles (e.g., vehicle A, B, and/or D) to take to avoid a collision. These instructions can be sent to each affected vehicle. In the case of autonomous vehicle, the edge node can immediately invoke an auto pilot mode and send instructions to the vehicle(s) to perform an evasive maneuver. The same or similar instruction can be provided to the driver of a non-autonomous vehicle to facilitate a manual maneuver.

Figure 5:
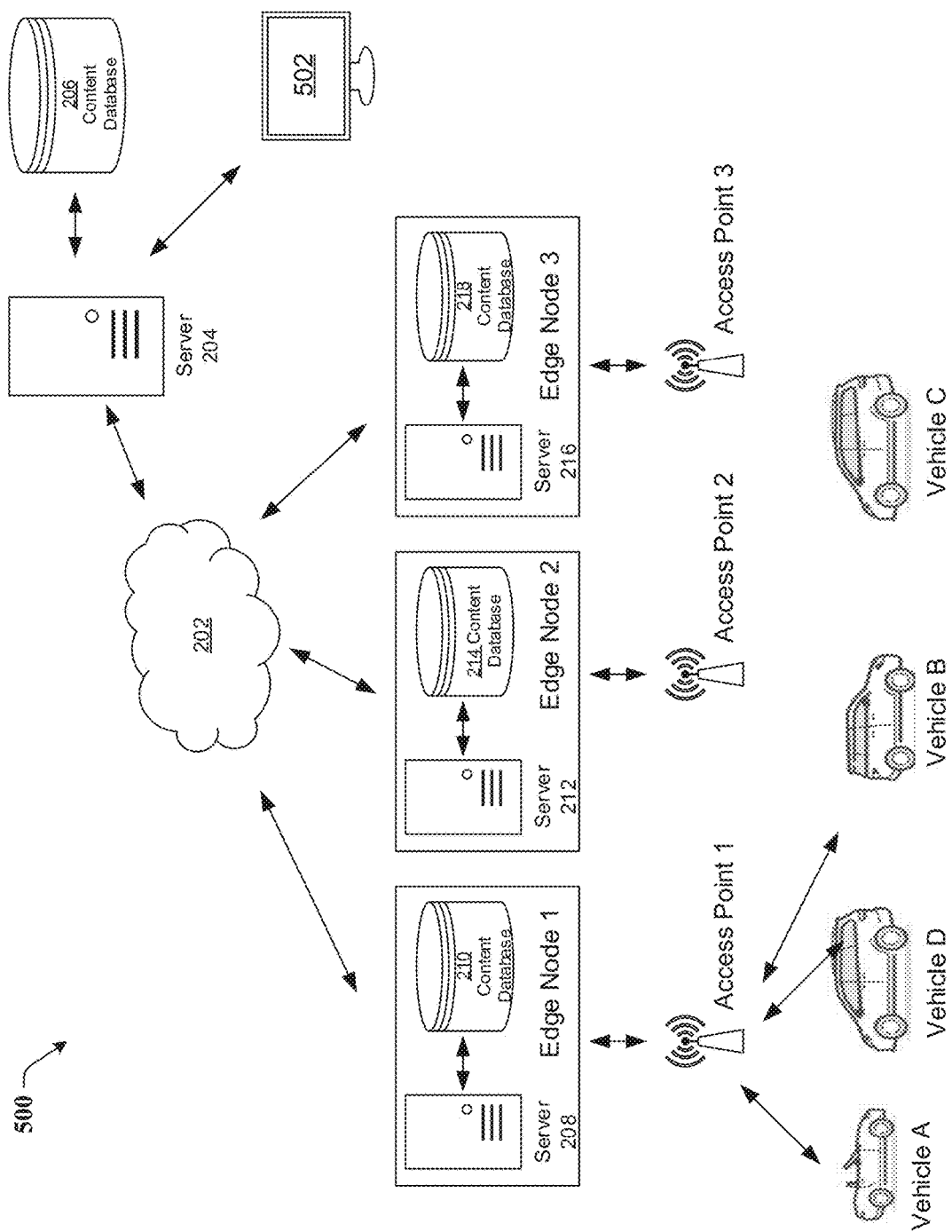
FIG. 5 illustrates an example schematic system block diagram of an edge network collaborative system according to one or more embodiments.

Referring now to FIG. 5 illustrates an example schematic system block diagram of an edge network collaborative system 500 according to one or more embodiments.

In another example, vehicle D can self-report its presence and/or any non-compliances to edge node 1. Vehicle D can comprise a mobile app, for instance, that periodically registers with edge node 1 (and/or other edge nodes when in range). Vehicle D can send data in a registration format such as a vehicle identification (ID) number, a driver ID, a company ID, current speed, destination, and/or other data. This can be the case, for example, for vehicles that use a tracking app for a fleet or as part of a ride-sharing service. For vehicles that are part of a fleet, a dangerous condition, once detected and assigned to a specific vehicle, can be reported to a central point, such as the company's operations center. The report can include a description of the condition detected, the make/model/color, license plate, VIN, driver ID, and/or other data. Once the condition is detected, the driver of the vehicle can be alerted. An alert can be sent from edge node 1 to vehicle D (via access point 1) for presentation to the driver via a visual display or audible readout. Additionally, this information can be shared, via the cloud-based infrastructure 202, with other geographically remote user devices 502. For instance, a fleet manager can be alerted of any non-compliances, once a threshold of non-compliances has been satisfied, and/or the types of non-compliances because this data can be sent to the fleet manager via the remote user device 502.

Figure 6:
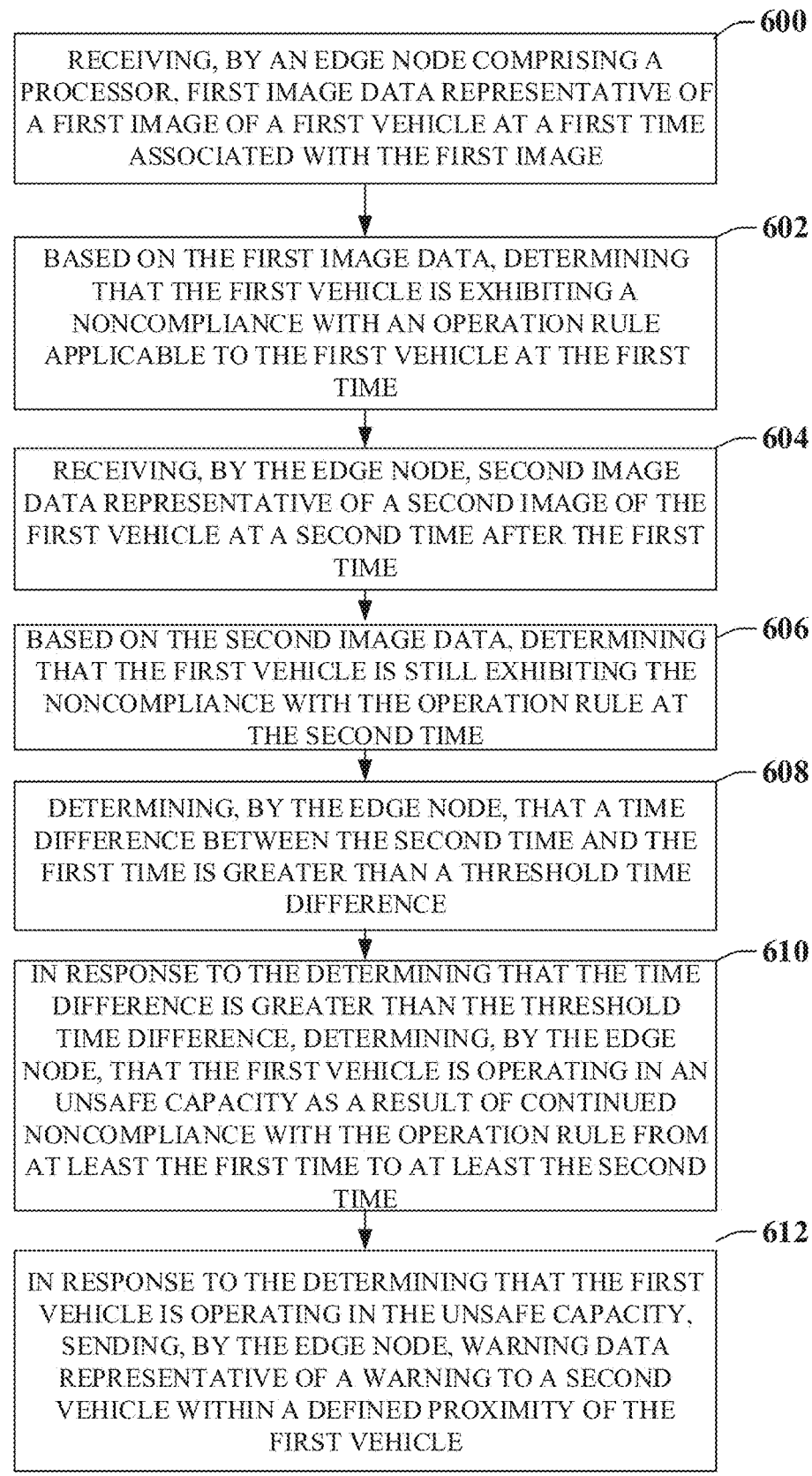
FIG. 6 illustrates an example flow diagram for a method for facilitating collaborative vehicle warnings according to one or more embodiments.

Referring now to FIG. 6, illustrated is an example flow diagram for a method for facilitating collaborative vehicle warnings according to one or more embodiments.

At element 600, the method can comprise receiving, by an edge node comprising a processor, first image data representative of a first image of a first vehicle at a first time associated with the first image. Based on the first image data, at element 602, the method can comprise determining that the first vehicle is exhibiting a noncompliance with an operation rule applicable to the first vehicle at the first time. At element 604, the method can comprise receiving, by the edge node, second image data representative of a second image of the first vehicle at a second time after the first time. Based on the second image data, at element 606, the method can comprise determining that the first vehicle is still exhibiting the noncompliance with the operation rule at the second time. At element 608, the method can comprise determining, by the edge node, that a time difference between the second time and the first time is greater than a threshold time difference. Furthermore, at element 610, in response to the determining that the time difference is greater than the threshold time difference, the method can comprise determining, by the edge node, that the first vehicle is operating in an unsafe capacity as a result of continued noncompliance with the operation rule from at least the first time to at least the second time. Additionally, at element 612, in response to the determining that the first vehicle is operating in the unsafe capacity, the method can comprise sending, by the edge node, warning data representative of a warning to a second vehicle within a defined proximity of the first vehicle.

Figure 7:
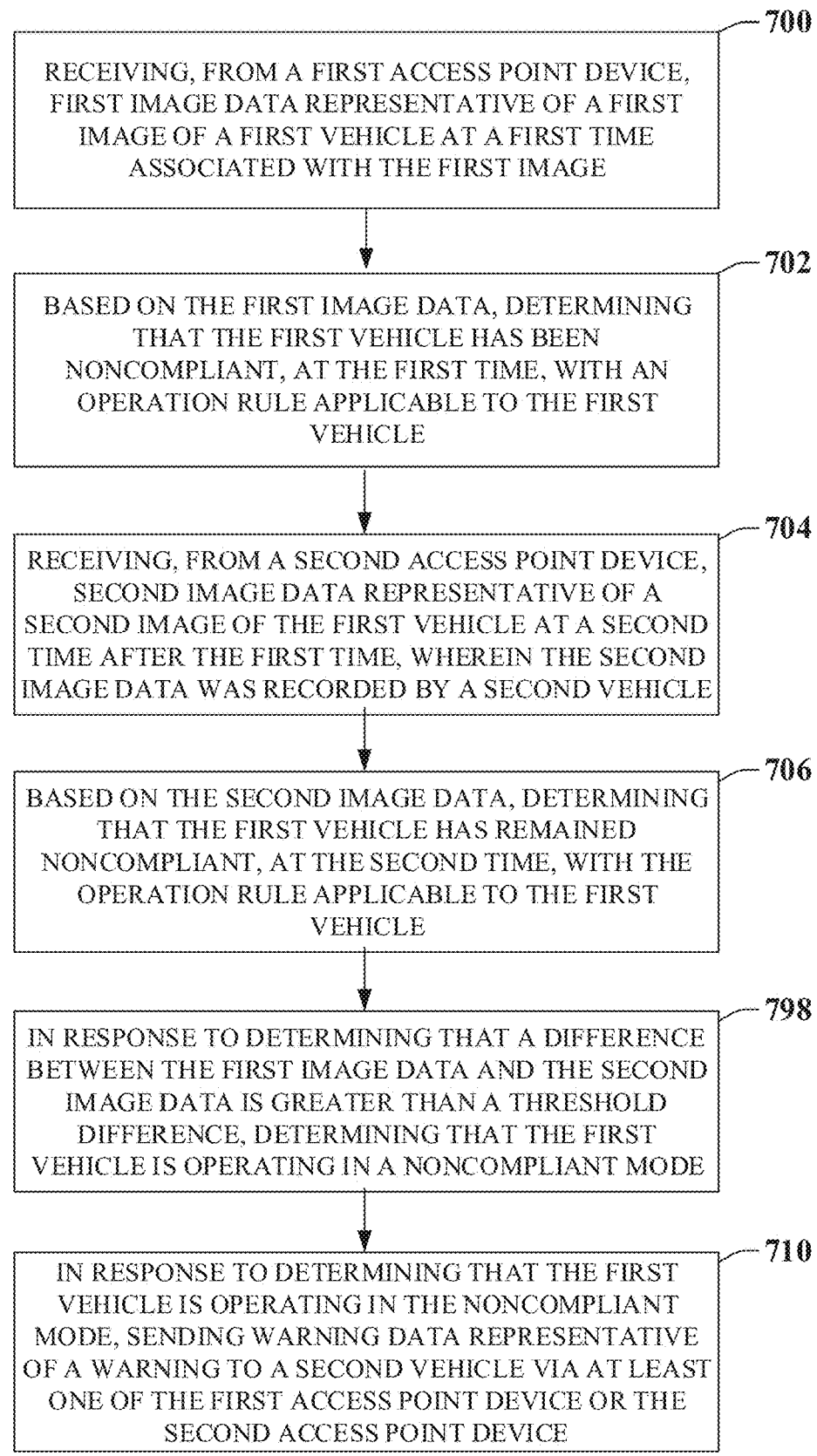
FIG. 7 illustrates an example flow diagram for network equipment for facilitating collaborative vehicle warnings according to one or more embodiments.

Referring now to FIG. 7, illustrated is an example flow diagram for network equipment for facilitating collaborative vehicle warnings according to one or more embodiments.

At element 700, the network equipment can facilitate receiving, from a first access point device, first image data representative of a first image of a first vehicle at a first time associated with the first image. Based on the first image data, at element 702, the network equipment can comprise determining that the first vehicle has been noncompliant, at the first time, with an operation rule applicable to the first vehicle. At element 704, the network equipment can comprise receiving, from a second access point device, second image data representative of a second image of the first vehicle at a second time after the first time, wherein the second image data was recorded by a second vehicle. Based on the second image data, at element 706, the network equipment can comprise determining that the first vehicle has remained noncompliant, at the second time, with the operation rule applicable to the first vehicle. Additionally, at element 708, in response to determining that a difference between the first image data and the second image data is greater than a threshold difference, the network equipment can comprise determining that the first vehicle is operating in a noncompliant mode. Furthermore, at element 710, in response to determining that the first vehicle is operating in the noncompliant mode, the network equipment can comprise sending warning data representative of a warning to a second vehicle via at least one of the first access point device or the second access point device.

Figure 8:
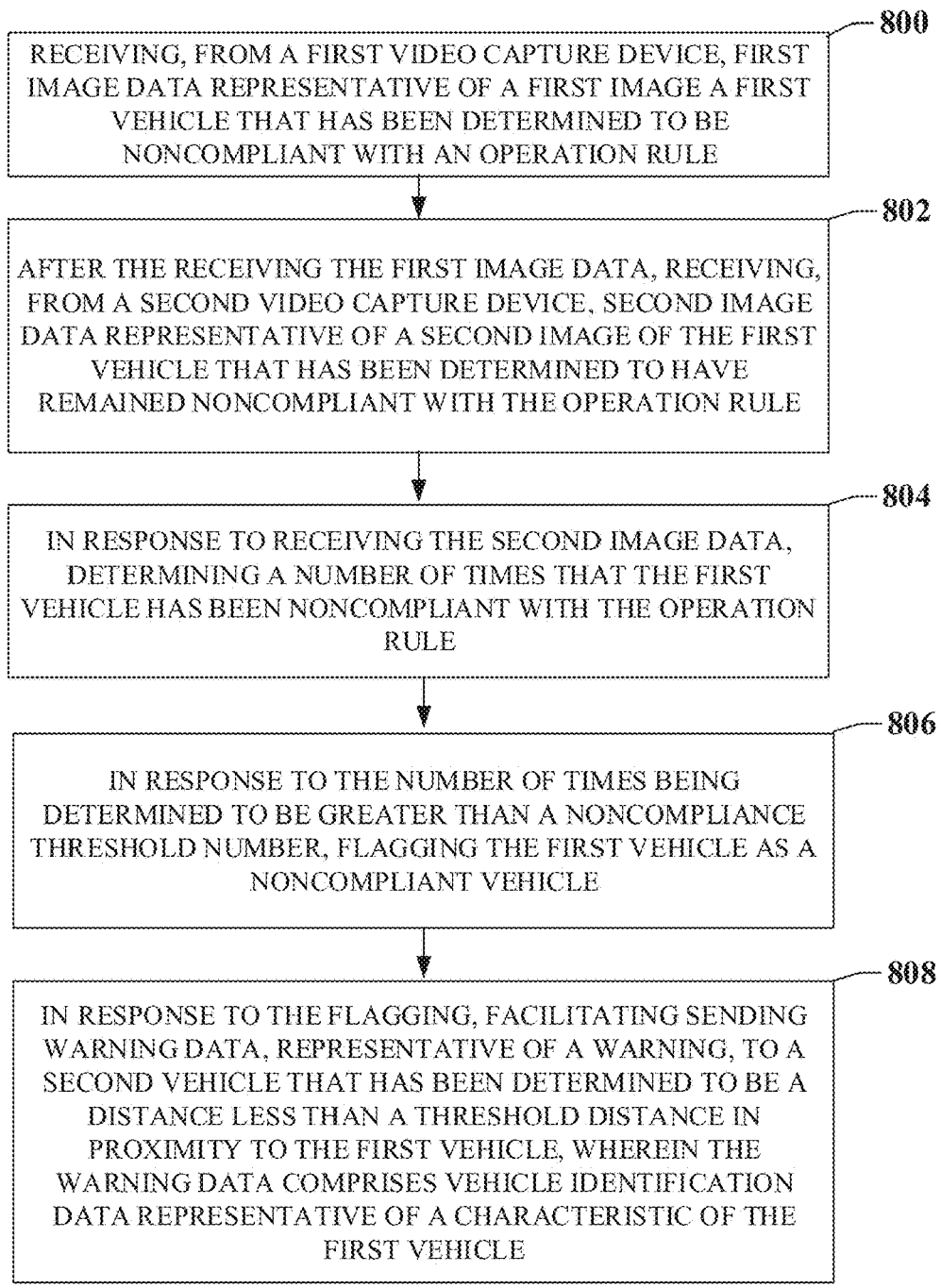
FIG. 8 illustrates an example flow diagram for a machine-readable medium for facilitating collaborative vehicle warnings according to one or more embodiments.

Referring now to FIG. 8, illustrated is an example flow diagram for a machine-readable medium for facilitating collaborative vehicle warnings according to one or more embodiments.

At element 800, the machine-readable medium can perform the operations comprising receiving, from a first video capture device, first image data representative of a first image a first vehicle that has been determined to be non-compliant with an operation rule. After the receiving the first image data, at element 802, the machine-readable medium can perform the operations comprising receiving, from a second video capture device, second image data representative of a second image of the first vehicle that has been determined to have remained noncompliant with the operation rule. In response to receiving the second image data, at element 804, the machine-readable medium can perform the operations comprising determining a number of times that the first vehicle has been noncompliant with the operation rule. In response to the number of times being determined to be greater than a noncompliance threshold number, at element 806, the machine-readable medium can perform the operations comprising flagging the first vehicle as a noncompliant vehicle. Furthermore, at element 808, in response to the flagging, the machine-readable medium can perform the operations comprising facilitating sending warning data, representative of a warning, to a second vehicle that has been determined to be a distance less than a threshold distance in proximity to the first vehicle, wherein the warning data comprises vehicle identification data representative of a characteristic of the first vehicle.

Figure 9:
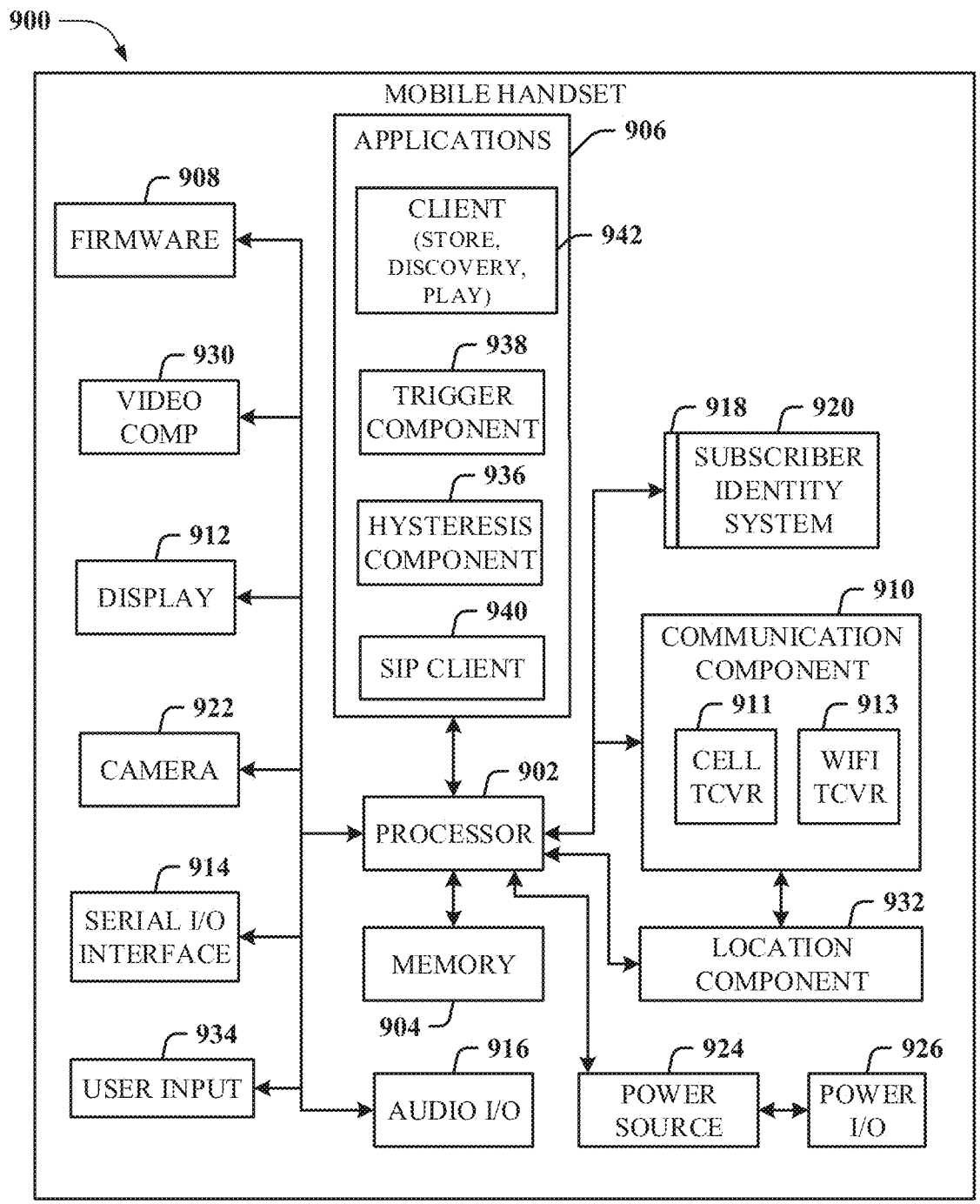
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
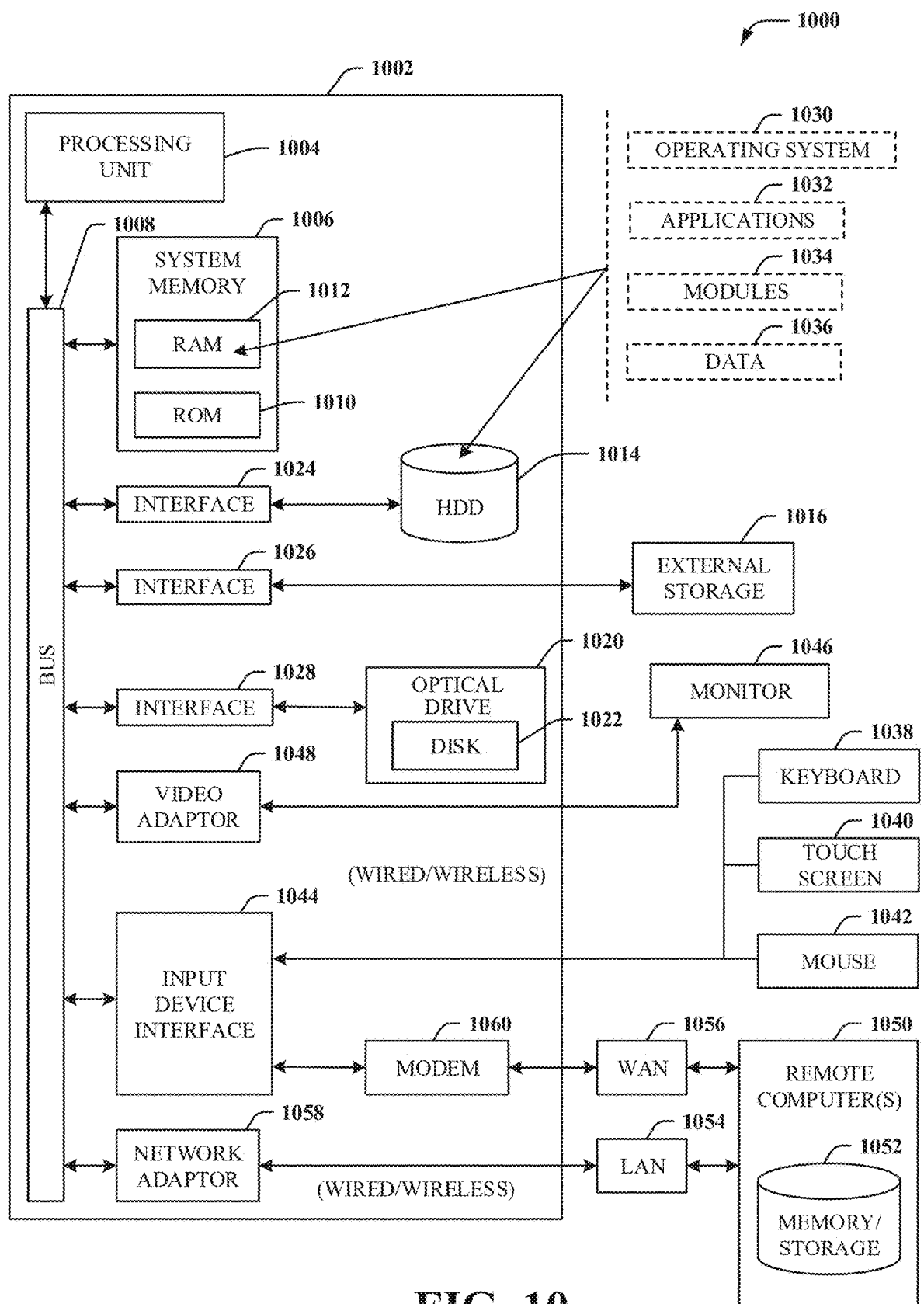
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by an edge node comprising a processor, first image data representative of a first image of a first vehicle at a first time associated with the first image;
based on the first image data, determining, by the edge node, that the first vehicle is exhibiting a noncompliance with an operation rule applicable to the first vehicle at the first time;
receiving, by the edge node, second image data representative of a second image of the first vehicle at a second time after the first time;
based on the second image data, determining, by the edge node, that the first vehicle is still exhibiting the noncompliance with the operation rule at the second time;
determining, by the edge node, that a time difference between the second time and the first time is greater than a threshold time difference;
in response to the determining that the time difference is greater than the threshold time difference, determining, by the edge node, that the first vehicle is operating in an unsafe capacity as a result of continued noncompliance with the operation rule from at least the first time to at least the second time; and
in response to the determining that the first vehicle is operating in the unsafe capacity, sending, by the edge node, warning data representative of a warning to a second vehicle within a defined proximity of the first vehicle.

2. The method of claim 1, further comprising:
based on an analysis of at least one of the first image data or the second image data, determining, by the edge node, a type of noncompliance by the first vehicle, and, based on the type of noncompliance, generating, by the edge node, the threshold time difference.

3. The method of claim 1, wherein the first image data comprises license plate data representative of a license plate of the first vehicle, and wherein the sending comprises sending the warning data to the second vehicle via an access point determined to be within a defined communicative range of the first vehicle and the second vehicle.

4. The method of claim 1, wherein the operating in the unsafe capacity comprises failing to display a turn signal by the first vehicle for at least the threshold time difference.

5. The method of claim 1, wherein the warning data is displayed with respect to a representation of the first vehicle via an augmented reality display perceivable from within, and determined to be associated with, the second vehicle.

6. The method of claim 1, wherein the operating in the unsafe capacity comprises a headlight of the first vehicle being determined to inactive for at least the threshold time difference.

7. The method of claim 6, further comprising:
sending, by the edge node to a device associated with the first vehicle, an indication that the headlight of the first vehicle has been determined to be inactive.

8. Network equipment, comprising:
a processor; and
a memory that stores executable instructions that, when executed by the processor, facilitate performance of operations, comprising:
receiving, from a first access point device, first image data representative of a first image of a first vehicle at a first time associated with the first image;
based on the first image data, determining that the first vehicle has been noncompliant, at the first time, with an operation rule applicable to the first vehicle;
receiving, from a second access point device, second image data representative of a second image of the first vehicle at a second time after the first time, wherein the second image data was recorded by a second vehicle;

based on the second image data, determining that the first vehicle has remained noncompliant, at the second time, with the operation rule applicable to the first vehicle;

in response to determining that a difference between the first image data and the second image data is greater than a threshold difference, determining that the first vehicle is operating in a noncompliant mode; and in response to determining that the first vehicle is operating in the noncompliant mode, sending warning data representative of a warning to a second vehicle via at least one of the first access point device or the second access point device.

9. The network equipment of claim 8, wherein the determining that the first vehicle is operating in the noncompliant mode comprises determining that a failure to signal indicative of a lane change has occurred at the first time and the second time.

10. The network equipment of claim 8, wherein the operations further comprise:

facilitating displaying the warning via a display perceivable from within, and determined to be associated with, the second vehicle.

11. The network equipment of claim 8, wherein the determining that the first vehicle is operating in the noncompliant mode comprises determining that the first vehicle is outside of a lane for a duration of time spanning at least the first time and the second time.

12. The network equipment of claim 8, wherein the determining that the first vehicle is operating in the noncompliant mode comprises a determining that the first vehicle has veered into a lane occupied by the second vehicle for a duration of time spanning at least the first time and the second time.

13. The network equipment of claim 8, wherein the operations further comprise:

based on an analysis of at least one of the first image data or the second image data, determining a type of noncompliance by the first vehicle;

based on the type of noncompliance, obtaining a repeat offender threshold; and determining that a number of times applicable to the first vehicle having been determined to have operated in the noncompliant mode exceeds the repeat offender threshold, wherein the sending further comprises sending the warning data to a law enforcement device associated with a law enforcement agency related to enforcement of the type of noncompliance.

14. The network equipment of claim 8, wherein the operations further comprise:

receiving weather data representative of a weather condition being experienced by the first vehicle; and based on the weather condition, applying a filter to at least one of the first image data or the second image data to reduce a noise signal associated with the weather condition.

15. The network equipment of claim 8, wherein the operations further comprise:

based on an analysis of at least one of the first image data or the second image data, determining a type of noncompliance by the first vehicle; and based on the type of noncompliance, obtaining the threshold difference.

16. A non-transitory machine-readable medium, comprising executable instructions that, when executed by a processor, facilitate performance of operations, comprising:

receiving, from a first video capture device, first image data representative of a first image a first vehicle that has been determined to be noncompliant with an operation rule;

after the receiving the first image data, receiving, from a second video capture device, second image data representative of a second image of the first vehicle that has been determined to have remained noncompliant with the operation rule;

in response to receiving the second image data, determining a number of times that the first vehicle has been noncompliant with the operation rule;

in response to the number of times being determined to be greater than a noncompliance threshold number, flagging the first vehicle as a noncompliant vehicle; and in response to the flagging, facilitating sending warning data, representative of a warning, to a second vehicle that has been determined to be a distance less than a threshold distance in proximity to the first vehicle, wherein the warning data comprises vehicle identification data representative of a characteristic of the first vehicle.

17. The non-transitory machine-readable medium of claim 16, wherein the vehicle identification data is determined from at least one of the first image data or the second data, and wherein the vehicle characteristic data comprises model data representative of at least one of a make or model of the first vehicle.

18. The non-transitory machine-readable medium of claim 16, wherein the warning data further comprises instruction data representative of an instruction to be displayed via a display device perceivable from within the second vehicle.

19. The non-transitory machine-readable medium of claim 18, wherein the instruction data comprises an instruction for a driver of the second vehicle to maneuver the second vehicle according to a defined route to avoid the first vehicle.

20. The non-transitory machine-readable medium of claim 16, wherein the number of times being determined to be greater than the noncompliance threshold number comprises the number of times being determined to be greater than the noncompliance threshold number within a defined duration of time.

* * * * *